(12) United States Patent
Brock et al.

(10) Patent No.: US 6,634,466 B1
(45) Date of Patent: Oct. 21, 2003

(54) BRAKE PEDAL FASTENER

(75) Inventors: Alec D. Brock, Larkspur, CO (US); Daniel L. Decker, Jr., Castle Rock, CO (US)

(73) Assignee: Master Concepts, Inc., Sedalia, CO (US)

(*) Notice: Subject to any disclaimer, the term of this patent is extended or adjusted under 35 U.S.C. 154(b) by 0 days.

(21) Appl. No.: 10/015,339

(22) Filed: Dec. 12, 2001

(51) Int. Cl.[7] ................................................. G05G 1/14
(52) U.S. Cl. ............................. 188/3 R; 74/512; 74/560
(58) Field of Search ........................... 188/3 R; 74/512, 74/513, 560

(56) References Cited

U.S. PATENT DOCUMENTS

| | | |
|---|---|---|
| 1,907,835 A | 5/1933 | Langbein |
| 2,566,859 A | 9/1951 | Seeler |
| 2,676,225 A | 4/1954 | Jubell |
| 2,711,228 A | 6/1955 | Shank |
| 2,964,965 A | 12/1960 | Hanson |
| 3,662,593 A | 5/1972 | Pirrello et al. ................. 73/132 |
| 3,866,719 A | 2/1975 | Streutker .................... 188/3 R |
| 3,877,318 A | 4/1975 | Castoe ......................... 74/481 |
| 3,991,609 A | 11/1976 | Asmus et al. ................. 73/132 |
| 4,186,595 A | 2/1980 | Domitter ..................... 73/132 |
| 5,012,689 A | 5/1991 | Smith ......................... 74/89.17 |
| 5,031,729 A | 7/1991 | Wittkop et al. ............. 188/3 H |
| 5,078,024 A * | 1/1992 | Cicotte et al. ................ 74/512 |
| 5,299,668 A | 4/1994 | Youngers et al. ........... 188/352 |
| 5,411,321 A | 5/1995 | Harness ......................... 303/7 |
| 5,460,061 A * | 10/1995 | Redding et al. .............. 74/512 |
| 5,911,483 A | 6/1999 | Overhulser .................... 303/7 |
| 5,915,797 A | 6/1999 | Springer ........................ 303/7 |
| 5,915,798 A | 6/1999 | Ford ............................... 303/7 |
| 6,095,619 A | 8/2000 | Granata ......................... 303/7 |
| 6,126,246 A | 10/2000 | Decker, Sr. et al. ........... 303/7 |
| 6,131,712 A | 10/2000 | Rhodenizer ................. 188/352 |

OTHER PUBLICATIONS

Article by K. Stephen Busick entitled, "Supplemental Braking Systems," Jul., 2001 issue of Family Motor Coaching magazine, pp. 60–75.

* cited by examiner

Primary Examiner—Christopher P. Schwartz
(74) Attorney, Agent, or Firm—Sheridan Ross P.C.

(57) ABSTRACT

An improved brake pedal fastener adapted for use with a tandem-type braking system is disclosed. In one embodiment, the brake pedal fastener is expandable and biased toward a closed position so that the fastener can be securely applied to and removed from varying sized brake pedals in a quick and easy manner.

17 Claims, 4 Drawing Sheets

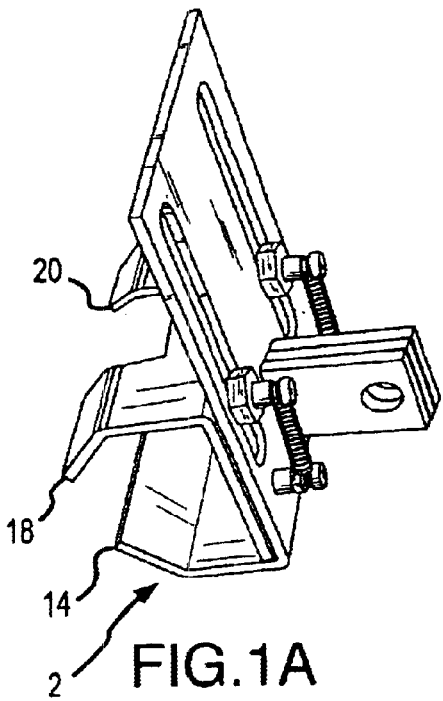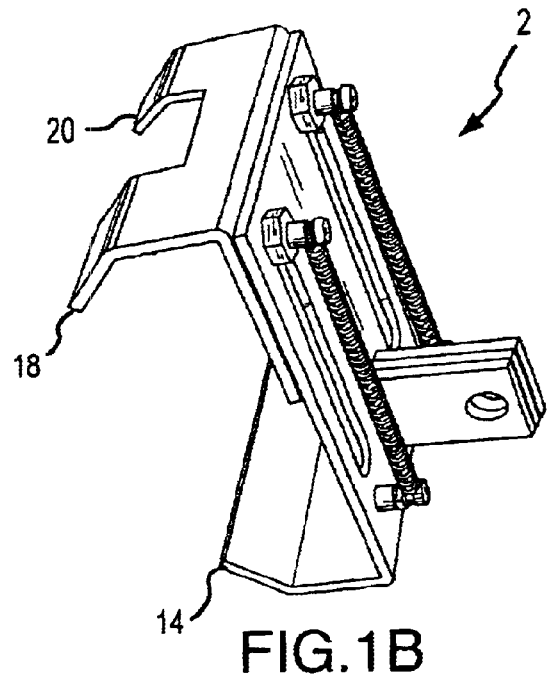
FIG.1A  FIG.1B
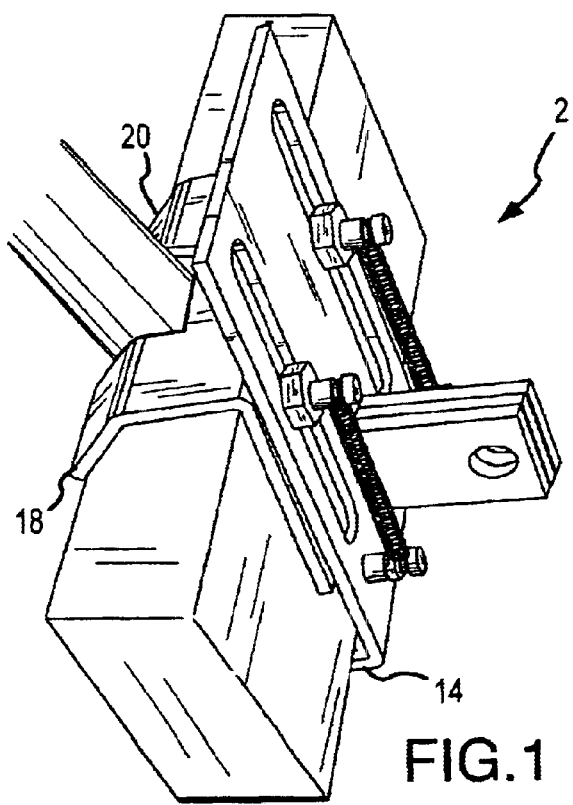
FIG.1

BRAKE PEDAL FASTENER

FIELD OF THE INVENTION

The present invention relates to the field of tandem vehicle braking systems and, more particularly, to an improved brake pedal fastener adapted for use with a towed vehicle braking system.

BACKGROUND OF THE INVENTION

When traveling by motor home, it is often desirable to tow a secondary vehicle behind the motor home. During such trips, it becomes necessary to brake the towed vehicle so as to avoid undue wear on the brakes of the motor home. Various methods of braking the towed vehicle in tandem with the motor home are well known in the art. A typical braking system is comprised of a pedal depressing apparatus that communicates with the towed vehicle's onboard braking system. Such apparatus are generally further comprised of a telescoping shaft or rod that is mechanically or hydraulically actuated, or is spring-biased. The shaft is typically mounted between the towed vehicle brake pedal and the steering wheel or the seat of that towed vehicle. When the shaft is actuated, the towed vehicle brake pedal is depressed and the towed vehicle is slowed in relation to the towing vehicle (such as a motor home, truck or car).

Regardless of how it is actuated, the shaft of the pedal depressing apparatus must be interconnected to the brake pedal of the towed vehicle. Various mechanisms are known in the art to accomplish this task. Known devices exist, which securely grip a brake pedal, but these devices are not easily and quickly installed or removed. For example, U.S. Pat. No. 5,411,321 to Harness discloses, among other things, a pedal-engaging clamp that is comprised of top and bottom clamp portions secured onto the brake pedal by bolts and wing nuts. The antiquated bolt and wing nut configuration of the Harness device precludes easy installation and removal. Similarly, U.S. Pat. No. 3,866,719 to Streutker discloses, among other things, a pedal clamp with a rigid plate having a pair of fingers that are spaced from the main body of the plate and a moveable plate that is rotatably tightened against the front of the brake pedal. Like the Harness device, the Streutker pedal clamp cannot be quickly installed or removed because the moveable plate must be screwed or unscrewed. Thus, there is a need for a brake pedal fastener that can be quickly and easily installed and removed.

Other brake fasteners are known, which can be more quickly installed than the Harness and Streutker devices. However, these fasteners are not easily separated from the brake system for maintenance purposes, nor are they universally adaptable for use with piston-type tandem brake systems. It would be advantageous to have an easily installable/removable brake pedal fastener that could be used with multiple tandem braking systems. Moreover, it is important for the pedal fastener to be modular so that it could be replaced or serviced.

Another problem exists with known brake pedal fasteners. Of those fasteners that may be quickly installed and removed, there are no known devices that grip the brake pedal by four or more surfaces and are easily and quickly adaptable for use with multiple sizes of brake pedals. For example, U.S. Pat. No. 5,915,797 to Springer discloses, among other things, a C-channel type brake pedal engaging member, which is retained by flanges around the sides of the pedal. Although Springer's engaging member appears to be capable of gripping a brake pedal by four surfaces, it not adjustable to accept multiple sizes of brake pedals. Other known devices, like that disclosed by Streutker, grip the brake pedal at three or less surfaces of contact (e.g., the front, top and back of the pedal). Since the towed vehicle is typically unoccupied, it would be advantageous to ensure that brake fastening device grip as many surfaces as possible in order to ensure that the device does not become dislodged in transit. Thus, there is a need for a more secure brake fastener that can be easily adapted for use with multiple sizes of brake pedals.

To obtain a complete understanding of the aforementioned patents, reference should be made directly thereto.

SUMMARY OF THE INVENTION

The present invention is designed to overcome the aforementioned problems and meet the aforementioned, and other, needs. It is thus one aspect of the present invention to provide an expandable, brake pedal fastener that can be adapted for use with varying sizes of brake pedals and which typically will contact at least four surfaces of the brake pedal. Another aspect of this invention is to provide a brake fastener that can be easily adapted for use with a piston-type tandem braking system.

In one embodiment of the present invention, an improved brake pedal fastener adapted for use with a tandem braking system, is provided, comprising:

(a) a stationary plate having a front side and a rear side;

(b) a moveable plate having a front side and a rear side, wherein the rear side of the moveable plate is slidably interconnected to the front side of the stationary plate; and (c) a coupling interconnected to the rear side of the stationary plate.

The present invention offers an alternative to traditional brake pedal engaging devices by offering an inexpensive, secure device. Now, an operator can more quickly and easily attach and remove a secure tandem braking system on a variety of brake pedals.

BRIEF DESCRIPTION OF DRAWINGS

FIG. 1 is a side perspective view of one embodiment of the brake pedal fastener in use with a brake pedal;

FIG. 1A is a side perspective view of one embodiment of the brake pedal fastener in a closed position;

FIG. 1B is a side perspective view of one embodiment of the brake pedal fastener in an open position;

Figure 2:
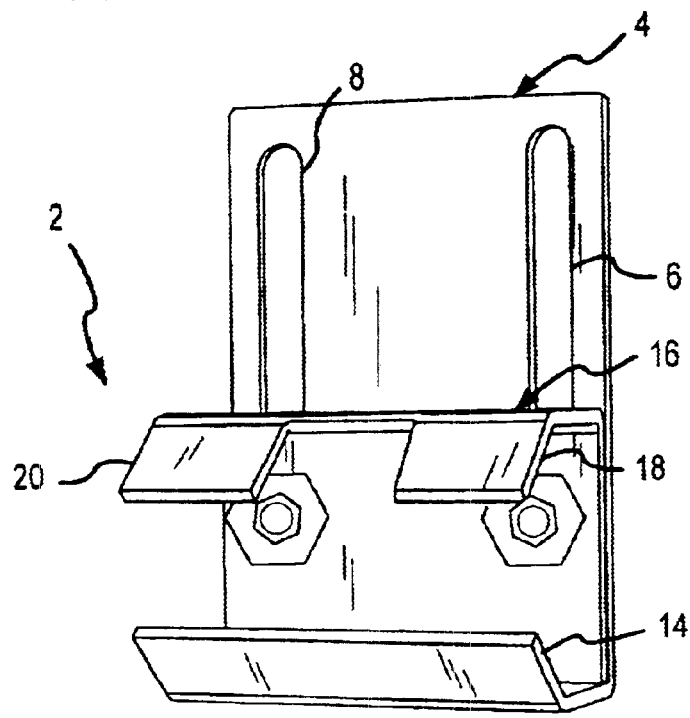
FIG. 2 is a front perspective view of one embodiment of the brake pedal fastener.

The following components and numbers associated thereto are shown in the drawings and provided here for ease of reference:

| # | Component |
|---|---|
| 2 | Brake pedal fastener |
| 4 | Stationary plate |
| 6 | First slot |
| 8 | Second slot |
| 10 | Coupling |
| 12 | Coupling aperture |
| 14 | Flange of stationary plate |
| 16 | Movable plate |
| 18 | First flange |
| 20 | Second flange |
| 22 | First pin of stationary plate |
| 24 | First pin of movable plate |
| 26 | First spring |
| 28 | Second pin of stationary plate |
| 30 | Second pin of movable plate |
| 32 | Second spring |
| 34 | Piston-type tandem braking system |

DETAILED DESCRIPTION OF THE PREFERRED EMBODIMENT

While this invention is susceptible of embodiments in many different forms, there are, as shown in the drawings and will herein be described in detail, preferred embodiments of the invention. The reader is to understand that the present disclosure is to be considered as an exemplification of the principles of the invention and is not intended to limit the broad aspects of the invention to the embodiments illustrated.

The present invention recognizes the limited nature of traditional brake fastening devices for tandem braking systems and offers a solution to the difficulty of quickly and securely installing these devices on various sized brake pedals. Thus, the present invention presents an improvement to traditional brake pedal fasteners.

Referring now to the drawings, FIG. 1 depicts a side perspective view of one embodiment of the present invention in use with a brake pedal. Substantially rectangular brake pedals of various sizes can be used with the brake pedal fastener 2. FIG. 1A depicts a side perspective view of one embodiment of the present invention in a closed position. The brake pedal fastener 2 is manually expanded to an open position (See FIG. 1B) and then slipped over the desired brake pedal. In one embodiment, the flanges (14, 18, 20) of the brake pedal fastener 2 straddle the brake pedal stem and grip top, bottom, front, and rear surfaces of the brake pedal.

Figure 3:
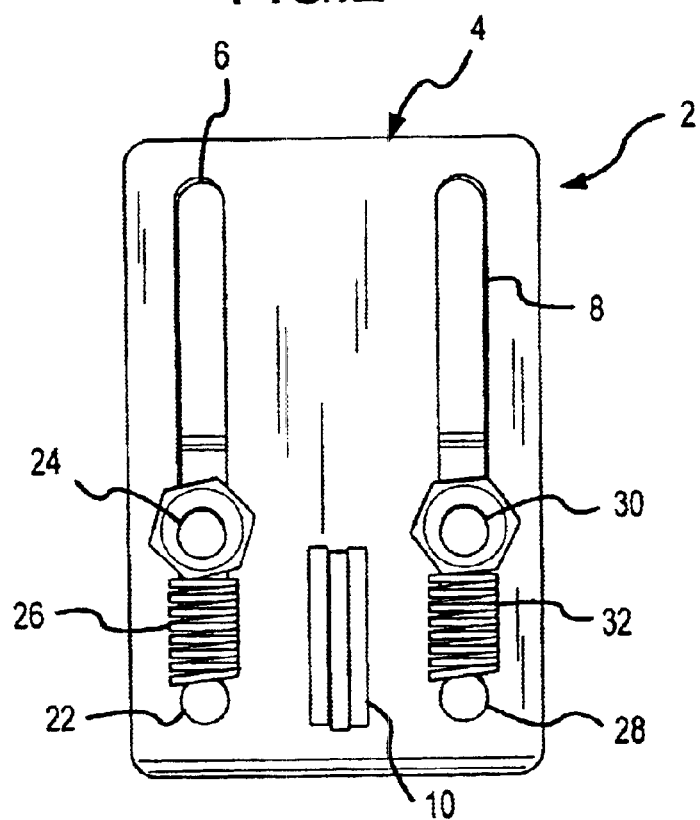
FIG. 3 is a rear elevation view of one embodiment of the brake pedal fastener.

FIGS. 2 and 3 depict front prospective and rear elevation views of one embodiment of the present invention. In general, the brake pedal fastener 2 is comprised of a stationary plate 4 and a moveable plate 16 with flanges (18, 20) for gripping the pedal. The moveable plate 16 is slidably interconnected to the stationary plate 4 via a first slot 6 and a second slot 8 in the stationary plate 4. The moveable plate 16 is spring-biased toward a closed position. A coupling 10 adapted for use with a piston-type tandem braking system is interconnected to the rear side of the stationary plate 4.

In one embodiment, the stationary plate 4 is comprised of a vertical plate with a flange 14 which is bent upward, thus, creating a generally J-like shape. As one skilled in the art can appreciate, the flange 14 may also be perpendicular to the bottom of the stationary plate 4, thus, creating an L-shape. Regardless of the resulting shape, the flange 14 is used to grip at least the bottom surface of the brake pedal and, for added stability, the rear surface as well.

In order to provide a mechanism for slidably interconnecting the moveable plate 16 to the stationary plate 4, the stationary plate 4 is further comprised of at least one slot. In one embodiment, as shown in FIG. 3, the stationary plate 4 has a vertical, first slot 6 in parallel to a second slot 8. A first pin 22 and a second pin 28 protrude from the back of the stationary plate 4 and are used in connection with a biasing means to keep the moveable plate 16 in a closed position. In one embodiment, the biasing means comprises a first spring 26 and a second spring 32.

The moveable plate 16 is generally comprised of a vertically-mounted plate with at least one finger-like flange for gripping the top and rear surfaces of the brake pedal. As shown in FIGS. 2 and 3, the preferable embodiment has a first flange 18 and a second flange 20. Mounted in parallel on the rear of the moveable plate 16 are a first pin 22 and a second pin 28 at a distance that corresponds to the first slot 6 and second slot 8. The first pin 22 and second pin 28 protrude through the rear of the stationary plate 4 via the first slot 6 and second slot 8.

Figure 4:
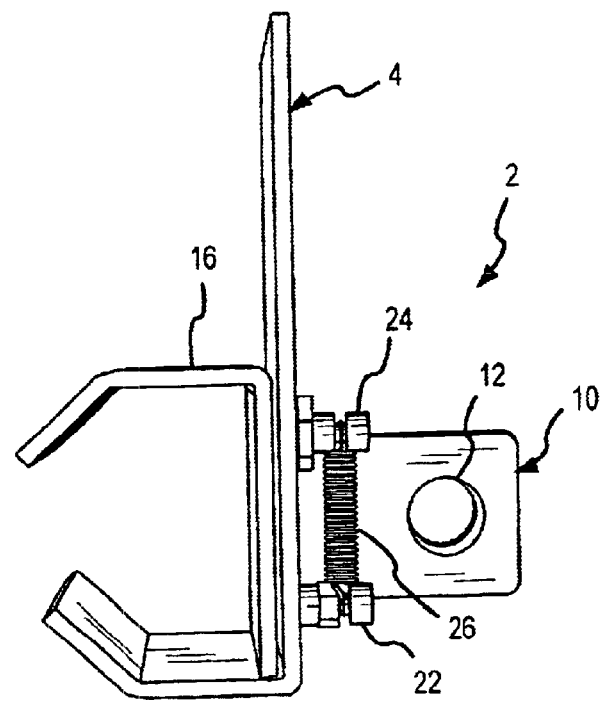
FIG. 4 is a right side perspective view of one embodiment of the brake pedal fastener.
Figure 5:
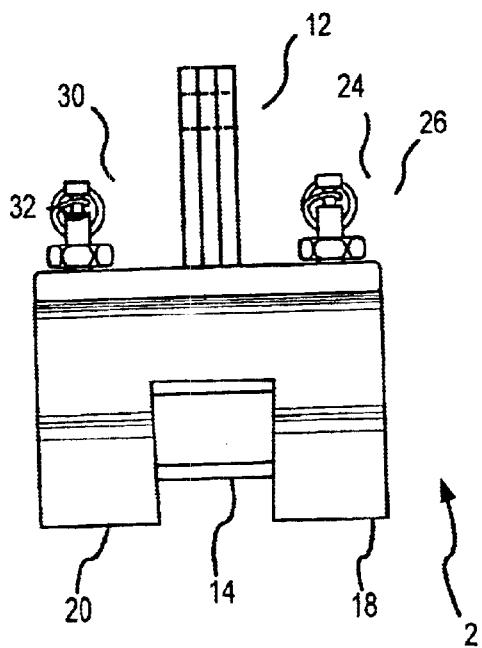
FIG. 5 is a top perspective view of one embodiment of the brake pedal fastener.
Figure 6:
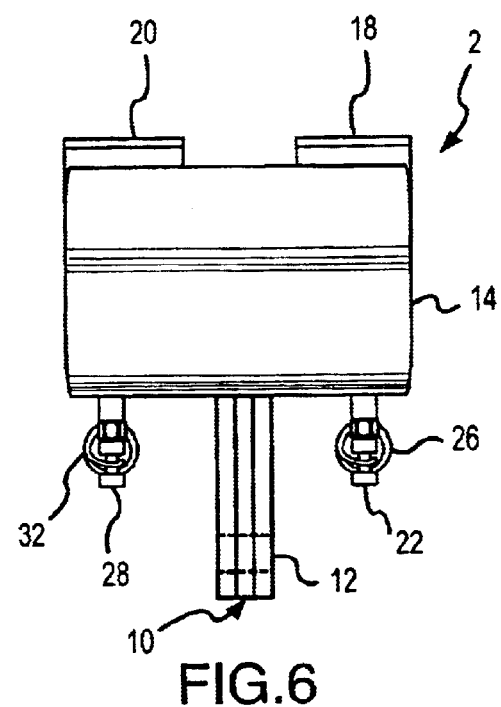
FIG. 6 is a bottom perspective view of one embodiment of the brake pedal fastener.

In order to ensure that the moveable plate 16 is tightly secured against the top of the brake pedal, a biasing means (such as a first spring 26 or similar device) is interconnected between the first pin of the stationary plate 22 and the first pin of the moveable plate 24. See FIG. 4. Similarly, a second spring 32 may also interconnect to a second pin of the stationary plate 28 and the second pin of the moveable plate 30. See FIGS. 3, 5, and 6. Used in tandem, the first spring 26 and the second spring 32 keep the moveable plate 16 biased toward a closed position. It is also possible to have the plate secured using rubber straps.

The stationary plate 4 and moveable plate 16 are generally comprised of rigid non-brittle materials which are durable and not likely to wear, deflect, or break during continual use. Metals and metal alloys such as stainless steel, carbon steel, titanium, and aluminum are preferable materials, as are numerous other metals commonly known in the art. Additionally, plastics, fiberglass, and other similar materials may also be used which have similar physical properties.

Figure 7:
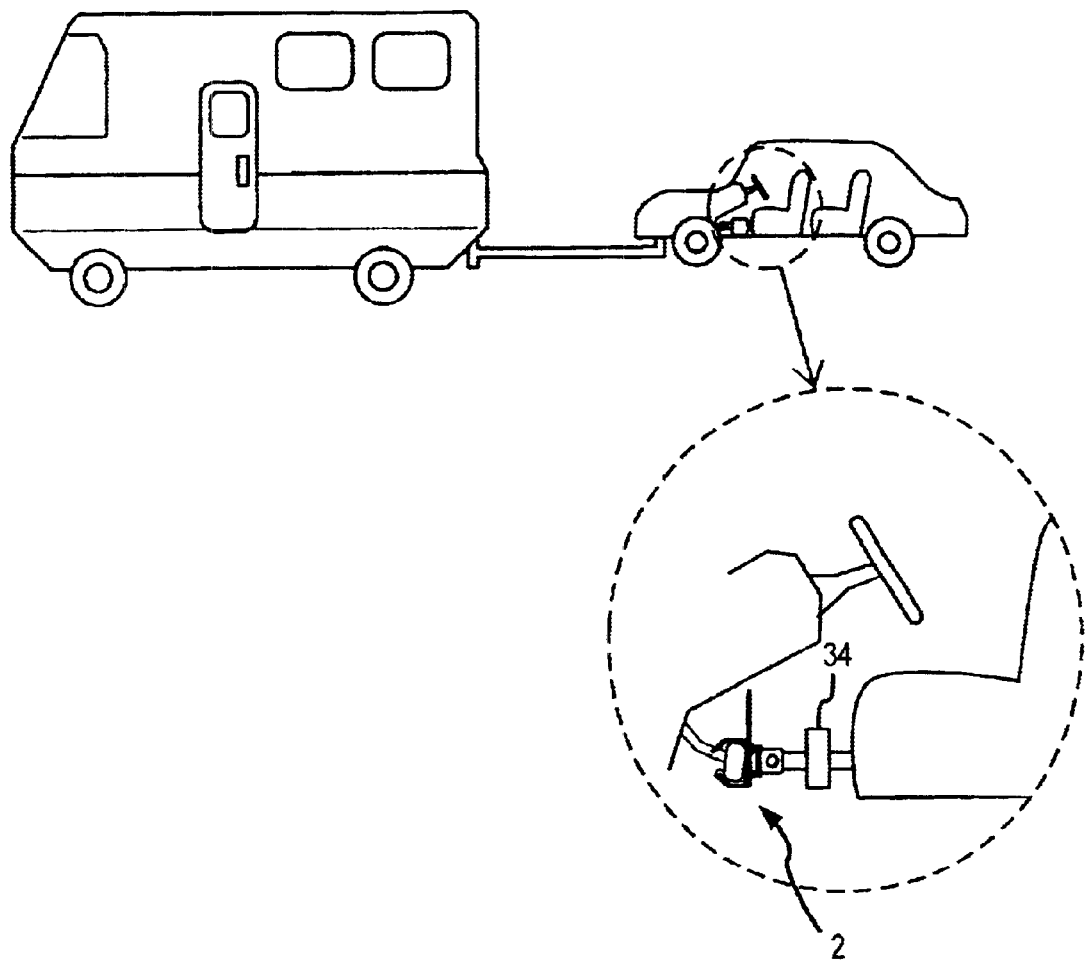
FIG. 7 is a side elevation view of one embodiment of the brake pedal fastener in use with the piston-type tandem brake system.

In order to operate the brake pedal fastener 2, an operator manually expands the moveable plate 16 upward with one hand while holding the stationary plate 4 with the other hand. The brake pedal fastener 2 is placed over the front of the brake pedal and the moveable plate 16 is released As a result, the brake pedal fastener 2 is firmly interconnected to the brake pedal, leaving the coupling 10 readily accessible for attachment to the piston-type tandem braking system 34. FIG. 7 depicts one embodiment of the brake pedal fastener 2 in use with the piston-type tandem braking system 34.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. An apparatus, adapted for use with a tandem-type braking system, comprising:
   (a) a stationary plate having a front side and a rear side, wherein at least a portion of the stationary plate is adapted to directly contact a brake pedal;
   (b) a moveable plate having a front side and a rear side, wherein the rear side of the moveable plate is slidably interconnected to the front side of the stationary plate; and (c) a coupling interconnected to the rear side of the stationary plate.

2. The apparatus of claim 1, wherein the moveable plate is interconnected to the stationary plate via at least one slot in the stationary plate.

3. The apparatus of claim 1, wherein the moveable plate is biased in a first direction.

4. The apparatus of claim 1, wherein the moveable plate is further comprised of at least one finger-like flange.

5. The apparatus of claim 4, wherein the at least one finger-like flange of the moveable plate is generally J-shaped and interconnected to the stationary plate in an opposable fashion to at least one flange of the stationary plate.

6. The apparatus of claim 1, wherein the stationary plate is further comprised of at least one flange.

7. The apparatus of claim 6, wherein the flange of the stationary plate is generally J-shaped.

8. An apparatus, adapted for use with a tandem-type braking system, comprising:
   (a) a stationary plate, wherein at least a portion of the stationary plate is adapted to directly contact a brake pedal;
   (b) an adjustable gripping means slidably interconnected to the stationary plate; and
   (c) a coupling means interconnected to the stationary plate.

9. The apparatus of claim 8, wherein the adjustable gripping means is slidably interconnected to the stationary plate via at least one slot in the stationary plate and at least one spring.

10. The apparatus of claim 8, wherein the adjustable gripping means is biased in a first position.

11. The apparatus of claim 8, wherein the adjustable gripping means is biased by at least one spring.

12. The apparatus of claim 8, wherein the coupling means further comprises a protrusion with an aperture for interconnecting the coupling means to the tandem-type braking system.

13. The apparatus of claim 8, wherein the adjustable gripping means is a moveable plate having at least one finger-like flange.

14. The apparatus of claim 13, wherein the at least one finger-like flange is generally J-shaped.

15. The apparatus of claim 13, wherein the at least one flange of the stationary plate is generally J-shaped.

16. The apparatus of claim 8, wherein the stationary plate is further comprised of a plate having at least one flange.

17. An apparatus, adapted for use with a tandem-type braking system, comprising:
   (a) a stationary plate having a J-shaped flange for gripping a brake pedal and a first pin and a second pin;
   (b) a first slot and a second slot vertically and parallel-positioned in the stationary plate;
   (c) a moveable plate having two finger-like flanges for gripping a brake pedal, and a first pin and a second pin, wherein the moveable plate is slidably interconnected to the stationary plate via the first slot and the second slot;
   (d) a first spring interconnecting the first pin of the stationary plate with the first pin of the moveable plate;
   (e) a second spring interconnecting the second pin of the stationary plate with the second pin of the moveable plate; and
   (f) a coupling for use with a tandem-type braking system interconnected to the stationary plate.

* * * * *